United States Patent [19]

Frankel et al.

[11] 3,904,674

[45] Sept. 9, 1975

[54] ENERGETIC POLYNITRO-HALOGENATED ALIPHATIC ESTERS

[75] Inventors: Milton B. Frankel, Tarzana; Gerald L. Rowley, Albany, both of Calif.

[73] Assignee: Rockwell International Corporation, El Segundo, Calif.

[22] Filed: Feb. 28, 1968

[21] Appl. No.: 710,704

[52] U.S. Cl. .............................. 260/485 F; 149/88
[51] Int. Cl... C07c 69/34; C07c 69/36; C07c 69/38
[58] Field of Search................................. 260/485 F

[56] References Cited
UNITED STATES PATENTS 3,387,044   6/1968   Grakauskas et al. ............... 260/644

*Primary Examiner*—Leland A. Sebastian
*Attorney, Agent, or Firm*—L. Lee Humphries; Robert M. Sperry

[57] ABSTRACT

Novel aliphatic esters of the general formula $R[CO_2AC(NO_2)_2F]_2$ wherein A is a lower alkylene and R is $(CH_2)_n$, $R'C=CR'$ or $C \equiv C$ and $n$ is 0 to 4 and $R'$ is hydrogen or methyl.

5 Claims, No Drawings

ENERGETIC POLYNITRO-HALOGENATED ALIPHATIC ESTERS

BACKGROUND OF THE INVENTION

The present invention relates to novel energetic aliphatic ester compounds which have utility as binders for explosive compositions of matter and as explosives per se. The energetic new compounds of the subject invention can be broadly characterized as having aliphatic chains substituted with both nitro and halogen moieties and joined together through an ester linkage.

More specifically, the compounds of this invention are of the general formula

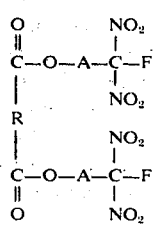

wherein A is the same or different and it is a member selected from the group consisting of branched and straight chain lower alkylene radicals, and wherein R is a bivalent radical selected from the group of radicals consisting of $(CH_2)_n$, $R'C=CR'$ or $C \equiv C$ wherein $n$ is 0 to 4 inclusive and $R'$ is hydrogen or methyl. For convenience, the general formula set forth immediately above can be depicted as $R[CO_2AC(NO_2)_2F]_2$.

The phrase straight or branched chain lower alkylene radical as used in this disclosure refers to alkylene groups containing one to four carbon atoms such as methylene, ethylene, propylene, isobutylene, butylene and the like. The alkylene radical can be conveniently represented by the general formula $C_nH_{2n}$ wherein $n$ is a positive whole number of 1 to 4 inclusive.

Non-limiting examples of the bivalent radicals mentioned supra are bivalent groups such as methylene ($-CH_2-$), ethylene

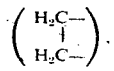

propylene

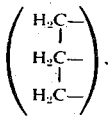

butylene

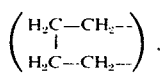

ethynylene

vinylene

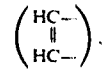

methyl substituted vinylene

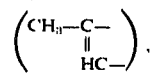

methylene substituted vinylene

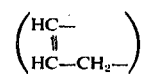

and the like.

SUMMARY OF THE INVENTION

Briefly, the invention is concerned with novel, energetic compounds of the general formula

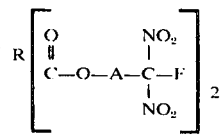

wherein R is a $(CH_2)_n$, $R'C=CR'$, or $C \equiv C$ and $n$ is 0 to 4, $R'$ is hydrogen or methyl, and wherein A in the ester moiety $CO_2A-C(NO_2)_2F$ is a lower alkylene of one to four carbon atoms inclusive.

DESCRIPTION OF THE PREFERRED EMBODIMENTS

The novel esters of the subject invention as set forth in the formula supra can be synthesized by the condensation of a 2,2-dinitro-2-fluoro-lower alkanol with an aliphatic dibasic acid chloride according to the following equation: $R[COCl]_2 + 2HOAC(NO_2)_2F \rightarrow R[CO_2AC(NO_2)_2F]_2 + 2HCl$ wherein R and A are as above defined. Exemplary of a presently preferred embodiment is $R[CO_2CH_2(NO_2)_2F]_2$ wherein R is as above defined. The condensation for preparing the compounds can be carried out by refluxing the appropriate chemical reagents for about 1 to 6 hours, that is, refluxing the acid chloride and the alcohol in an inert organic solvent and usually in the presence of a suitable reaction catalyst.

Typical aliphatic dibasic acid chlorides suitable for preparing the novel esters of this invention according to the general reaction as set forth above are the conventional acid chlorides such as fumaryl chloride, citraconyl chloride, mesaconyl chloride, acetylene dicarboxylyl chloride, succinyl chloride, malonyl chloride, glutaryl chloride, adipyl chloride, oxalyl chloride and the like.

Exemplary of inert, organic solvents suitable for the above reaction are methylene dichloride, ethylene dichloride, dichloromethane, chloroform, carbon tetrachloride, methylcyclohexane, isooctane, hexane, chlorobenzene or any other inert organic solvent that does not adversely affect the reaction.

Non-limiting examples of catalysts acceptable for the purpose of this invention are catalysts such as piperdine, pyridine, piperazine, triethylamine, trimethylamine, dimethylmonoethylamine, tributylamine, potassium carbonate, aluminum chloride and the like. The amount of catalyst employed can vary according to the desired reaction rate and it will usually range from a trace to stoichiometric amounts. Generally, for about 8 to 15 grams of total reactants about 0.01 gram to about 10 grams of the catalysts can be used. For the preparation of the compounds an excess of catalysts is usually employed, generally about 5 to 20 percent excess and the like.

Illustrative of the alcohols, HO—A—C(NO$_2$)F which can be used in the disclosed reaction are alcohols such as 2-fluoro-2,2-dinitroethanol, 3-fluoro-3,3-dinitropropanol, 4-fluoro-4,4-dinitrobutanol and the like. The alcohols are readily available or they can easily be prepared by conventional processes such as the reaction of fluorine with the appropriate alcohol, for example, 2-fluoro-2,2-dinitroethanol can be prepared by the reaction of fluorine with 2,2-dinitroethanol or the metal salt thereof.

The above discussion is merely illustrative of the mode and manner of carrying out the invention, and it is to be understood that the discussion is not intended to be limited to the instant disclosure, as other techniques may be successfully employed.

The following examples are representative of embodiments of the present invention and these examples are not to be construed as limiting as other obvious embodiments will be readily apparent to those versed in the present art.

EXAMPLE I

Preparation of bis-(2,2-dinitro-2-fluoroethyl)-oxalate: To 2.54 grams (0.01 mole) of oxalyl chloride was added 6.06 grams (0.04 mole) of 2,2-dinitro-2-fluoroethanol, 0.26 grams of anhydrous aluminum chloride and 20 ml. of ethylene dichloride and the reaction mixture was refluxed for about 5 hours at normal atmospheric pressure. On cooling, a crystalline solid separated from the reaction medium. The product was then collected and recrystallized from ethylene dichloride to give white needles with a melting point of 91.5°–92°C. The calculated elemental analysis for $C_6H_4F_2N_4O_{12}$ was C, 19.90; H, 1.11; F, 10.49. The found analysis was C, 20.25; H, 1.69; F, 10.65. The infrared spectrum, in Nujol, exhibited maximum peaks at 5.6, 6.2, and 7.6 microns.

EXAMPLE II

Other compounds of this invention which are preparable according to the above described and illustrated procedure by selecting the appropriate starting materials, are for example:

EXAMPLE III

Preparation of bis-(2,2-dinitro-2-fluoroethyl)-malonate: Malonyl chloride (4.94 grams, 35.0 mmoles) was added with stirring at 0°C. to a 45 ml. dichloromethane solution of 2,2-dinitro-2-fluoroethanol (11.3 grams, 73.5 mmoles, 5 percent excess). To this solution, an 11 ml. dichloromethane solution of anhydrous pyridine (5.52 grams, 70.0 mmoles) was added dropwise with constant stirring at 0°C. The resulting orange solution was allowed to warm to room temperature and then refluxed for two hours to give a green-brown solution. It was then diluted with dichloromethane, washed with three portions each of 5 percent hydrochloric acid, water, 5 percent sodium bicarbonate, and water, and dried over anhydrous sodium sulfate with added charcoal. The solvent was removed under reduced pressure leaving 9.4 grams (71 percent) orange oil which crystallized slowly at room temperature. Recrystallization from a mixed ethanol-isopropanol solvent yielded 5.12 grams of white prisms with a melting point of 48.5°–49.5°C. A subsequent recrystallization from ethanol yielded the analytical sample with a melting point of 49°–50°C. The infrared spectrum for the compound, in Nujol, exhibited maximum peaks at 5.6, 6.2 and 7.6 microns. The calculated elemental analysis for $C_7H_6F_2N_4O_{12}$ was: C, 22.35; H, 1.61; N, 14.90. The found analysis was C, 22.36; H, 1.58; N, 14.94.

EXAMPLE IV

Preparation of bis-(2,2-dinitro-2-fluoroethyl)-fumarate: 0.71 grams (4.64 mmoles) of fumaryl chloride and 2,2-dinitro-2-fluoroethanol (1.69 grams, 11.0 mmoles, 18 percent excess) were dissolved in 10 ml. of dichloromethane. Vacuum dried (140°) potassium carbonate (4.14 grams, 30.0 mmoles, 323 percent excess) was added in one portion to the dichloromethane solution. Then, the mixture warmed and boiled for about 3 minutes. Next, the mixture was refluxed for 2 hours under anhydrous conditions, the solid was filtered therefrom. The filtrate was then diluted with dichloromethane, washed with four portions of water and dried over anhydrous sodium sulfate. The solvent was removed under reduced pressure leaving 1.09 grams (61 percent) pale yellow oil which crystallized slowly at room temperature to give a solid with a melting point of 62.5°–67°C. Recrystallization of this solid from isopropanol yielded 0.75 gram colorless plates with a melting point of 75°–76°C. Another recrystallization from isopropanol yielded the analytical sample with a melting point of 75.5°–76.5°C. The calculated elemental analysis for $C_8H_6F_2N_4O_{12}$ was: C, 24.75; H, 1.56; N, 14.44. The found analysis was: C, 24.63; H, 1.51; N, 14.28. The infrared spectrum for the compound, in

| Starting Material | Reagent | Product |
|---|---|---|
| Succinyl chloride | 2,2-dinitro-2-fluoroethanol | bis-(2,2-dinitro-2-fluoroethyl) succinate |
| Glutaryl chloride | 2,2-dinitro-2-fluoroethanol | bis-(2,2-dinitro-2-fluoroethyl) glutarate |
| Adipyl chloride | 2,2-dinitro-2-fluoroethanol | bis-(2,2-dinitro-2-fluoroethyl) adipate |
| Citraconyl chloride | 2,2-dinitro-2-fluoroethanol | bis-(2,2-dinitro-2-fluoroethyl) citraconate |
| Acetylene dicarboxylyl chloride | 2,2-dinitro-2-fluoroethanol | bis-(2,2-dinitro-2-fluoroethyl) acetylene dicarboxylate |
| Mesaconyl chloride | 2,2-dinitro-2-fluoroethanol | bis-(2,2-dinitro-2-fluoroethyl) mesaconate |

Nujol, exhibited maximum peaks at 5.7, 6.2, 7.6 and 8.3 microns.

The novel compounds of the invention prepared by the above described processes were tested by standard explosive evaluation tests to demonstrate the unexpected results of the present invention. The tests conducted were the drop test and the vacuum thermal stability test.

The drop test measures the sensitivity of a given explosive to shock or impact. The drop test consists of placing a small sample upon a hard surface and allowing a known weight, usually 5 pounds, to drop onto the sample from a predetermined height. The height from which the weight must drop to explode the sample is a measure of the sample's sensitivity to shock or impact.

The vacuum thermal stability test measures the heat sensitivity and it indicates the volume of gas evolved for a known explosive heated to a predetermined temperature and maintained at said temperature for any given time.

The results of these tests for bis-(2,2-dinitro-2-fluoroethyl)-malonate, $CH_2[CO_2CH_2C(NO_2)_2F]_2$, are as follows:

| | |
|---|---|
| Impact sensitivity | 48 in./5 lb. weight |
| Vacuum thermal stability | ml. gas evolved/g. at 165°C. |
| | 0.61 ml./1 hour |
| | 1.1 ml./2 hours |
| | ml. gas evolved/g. at 180°C. |
| | 4.0 ml./1 hour |

The compound's unobvious increased impact insensitivity for the explosive bis-(2,2-dinitro-2-fluoroethyl)-malonate can readily be seen when it is compared against a known explosive "RDX," (cyclotrimethylene trinitroamine) which exhibited an impact sensitivity of 28 inches per 5 pound weight. The malonate ester has an explosive power of about 120 as compared to trinitrotoluene with an explosive power of 100. The novel compound bis-(2,2-dinitro-2-fluoroethyl)-oxalate has an explosive power of 119 as compared to conventional trinitrotoluene with an explosive power of 100.

The energetic compounds of the present invention can be used in pure form or mixed with other explosives like nitroglycerine, ammonium nitrate, picric acid, pentaerythriol tetranitrate and the like. Exemplary of a mixed energetic composition is a composition consisting essentially of 60 parts of HMX (cyclotetramethylene tetranitroamine) and 40 parts of bis-(2,2-dinitro-2-fluoroethyl)-malonate. The energetic compounds and the compositions of matter formed by mixing the compounds with other explosives or energetic like compounds can be used for many purposes such as, demolition, rock blasting, shells, plasticizers in solid propellants, incendiary compositions, oil well shooting and the like.

Obviously, many modifications and variations of the instant invention are possible in the light of the above teachings. It is, therefore, to be understood that within the scope of the disclosure and appended claims, the invention may be practiced otherwise than is specifically described.

We claim:

1. Novel energetic compounds of the general formula $R[CO_2AC(NO_2)_2F]_2$ wherein R is $(CH_2)_n$ or $C \equiv C$ and A is an alkylene of one to four carbon atoms and wherein $n$ is 0 to 4.

2. An energetic compound according to claim 1 wherein A is ethylene and R is $(CH_2)_n$ and wherein $n$ is 0.

3. An energetic compound according to claim 1 wherein A is ethylene and R is $(CH_2)_n$ and wherein $n$ is 1.

4. Bis-(2,2-dinitro-2-fluoroethyl)-oxalate.

5. Bis-(2,2-dinitro-2-fluoroethyl)-malonate.

* * * * *